(12) United States Patent
Han et al.

(10) Patent No.: US 11,008,537 B2
(45) Date of Patent: May 18, 2021

(54) CLEANING COMPOSITION FOR LIQUID CRYSTAL ALIGNMENT LAYER AND MANUFACTURING METHOD OF LIQUID CRYSTAL ALIGNMENT LAYER USING THE SAME

(71) Applicant: LG CHEM, LTD., Seoul (KR)

(72) Inventors: Hee Han, Daejeon (KR); Jun Young Yoon, Daejeon (KR); Jung Ho Jo, Daejeon (KR); Hang Ah Park, Daejeon (KR); Soon Ho Kwon, Daejeon (KR); Hyeong Seuk Yun, Daejeon (KR)

(73) Assignee: LG CHEM, LTD., Seoul (KR)

( * ) Notice: Subject to any disclaimer, the term of this patent is extended or adjusted under 35 U.S.C. 154(b) by 132 days.

(21) Appl. No.: 16/067,784

(22) PCT Filed: Jan. 26, 2017

(86) PCT No.: PCT/KR2017/000991
§ 371 (c)(1),
(2) Date: Jul. 2, 2018

(87) PCT Pub. No.: WO2017/150810
PCT Pub. Date: Sep. 8, 2017

(65) Prior Publication Data
US 2019/0016998 A1    Jan. 17, 2019

(30) Foreign Application Priority Data

Mar. 3, 2016 (KR) .................. 10-2016-0025873

(51) Int. Cl.
*G02F 1/1337*   (2006.01)
*C11D 7/26*     (2006.01)
(Continued)

(52) U.S. Cl.
CPC ............ *C11D 7/267* (2013.01); *C09D 179/08* (2013.01); *C09K 19/56* (2013.01); *C11D 7/26* (2013.01);
(Continued)

(58) Field of Classification Search
CPC .................................................. C11D 11/0047
(Continued)

(56) References Cited

U.S. PATENT DOCUMENTS 5,679,631 A   10/1997  Bohnert et al.
5,969,055 A   10/1999  Nishikawa et al.
(Continued)

FOREIGN PATENT DOCUMENTS

CN    1724626 A    1/2006
CN    1806197 A    7/2006
(Continued)

OTHER PUBLICATIONS

Search Report and Written Opinion issued for International Application PCT/KR2017/000991 dated May 12, 2017, 10 pages.
(Continued)

*Primary Examiner* — Gregory E Webb
(74) *Attorney, Agent, or Firm* — Rothwell, Figg, Ernst & Manbeck, P.C.

(57) ABSTRACT

The present invention relates to a cleaning composition for a liquid crystal alignment layer, a manufacturing method of a liquid crystal alignment layer using the same, and a liquid crystal display device including the liquid crystal alignment layer manufactured by the manufacturing method. More specifically, the present invention relates to a cleaning composition for a liquid crystal alignment layer that is capable of solving a non-uniformity problem of the liquid crystal alignment layer and effectively removing an ionic byproduct on a polymer surface to increase anisotropy of the (Continued)

liquid crystal alignment layer, by using a cleaning composition including a specific solvent in a cleaning process after a UV alignment process, and a manufacturing method of a liquid crystal alignment layer.

18 Claims, 3 Drawing Sheets

(51) Int. Cl.

| | | |
|---|---|---|
| C09K 19/56 | (2006.01) | |
| C09D 179/08 | (2006.01) | |
| G02F 1/13 | (2006.01) | |
| C11D 7/50 | (2006.01) | |
| C11D 11/00 | (2006.01) | |
| C08G 73/10 | (2006.01) | |

(52) U.S. Cl.
CPC ............ *C11D 7/263* (2013.01); *C11D 7/266* (2013.01); *C11D 7/5009* (2013.01); *C11D 7/5013* (2013.01); *C11D 7/5022* (2013.01); *C11D 11/0047* (2013.01); *G02F 1/13* (2013.01); *G02F 1/1337* (2013.01); *G02F 1/133788* (2013.01); *C08G 73/1042* (2013.01); *C08G 73/1078* (2013.01); *G02F 1/133723* (2013.01)

(58) Field of Classification Search
USPC .......................................................... 510/175
See application file for complete search history.

(56) References Cited

U.S. PATENT DOCUMENTS

| | | | |
|---|---|---|---|
| 8,313,571 B2* | 11/2012 | Nawrocki | C09D 11/36 106/31.13 |
| 8,692,970 B2 | 4/2014 | Uchino et al. | |
| 2004/0063042 A1 | 4/2004 | Egbe | |
| 2006/0016785 A1 | 1/2006 | Egbe et al. | |
| 2007/0036915 A1 | 2/2007 | Kurosaki et al. | |
| 2009/0081379 A1* | 3/2009 | Nawrocki | C09D 11/36 427/541 |
| 2009/0146105 A1 | 6/2009 | Oh et al. | |
| 2013/0011783 A1 | 1/2013 | Ober et al. | |
| 2013/0012655 A1* | 1/2013 | Sakai | C08G 73/026 524/609 |
| 2013/0116159 A1 | 5/2013 | Pollard et al. | |
| 2013/0296215 A1 | 11/2013 | Rao et al. | |
| 2014/0368775 A1 | 12/2014 | Park et al. | |
| 2014/0368779 A1 | 12/2014 | Park et al. | |
| 2015/0118488 A1 | 4/2015 | Bai et al. | |
| 2015/0299628 A1* | 10/2015 | Choi | H01L 21/02068 510/254 |
| 2017/0058200 A1* | 3/2017 | Eckert | C08G 73/1025 |

FOREIGN PATENT DOCUMENTS

| | | |
|---|---|---|
| CN | 102207680 A | 10/2011 |
| CN | 102603701 A | 7/2012 |
| CN | 103809392 A | 5/2014 |
| CN | 104395820 A | 3/2015 |
| CN | 104733289 A | 6/2015 |
| EP | 0500951 A1 | 9/1992 |
| JP | 08-026347 B2 | 3/1996 |
| JP | 10-060275 A | 3/1998 |
| JP | 2001-194806 A | 7/2001 |
| JP | 2002-278092 A | 9/2002 |
| JP | 2003-114540 A | 4/2003 |
| JP | 2005-043874 A | 2/2005 |
| JP | 2006-501327 A | 1/2006 |
| JP | 2006-096984 A | 4/2006 |
| JP | 5654228 B2 | 1/2015 |
| KR | 10-2011-0046805 A | 5/2011 |
| KR | 10-1202721 B1 | 11/2012 |
| KR | 10-2013-0115926 A | 10/2013 |
| KR | 10-2014-0029167 A | 3/2014 |
| KR | 10-2014-0063795 A | 5/2014 |
| KR | 10-2014-0146522 A | 12/2014 |
| KR | 10-2015-0001826 A | 1/2015 |
| KR | 10-2015-0137125 A | 12/2015 |
| KR | 10-2015-0143240 A | 12/2015 |
| TW | 201345953 A | 11/2013 |
| TW | 201410793 A | 3/2014 |
| TW | 201500820 A | 1/2015 |
| WO | 2007-037628 A | 4/2007 |
| WO | 2013-187493 A1 | 12/2013 |
| WO | 2014-204178 A1 | 12/2014 |

OTHER PUBLICATIONS

European Search Report issued in European Patent Application No. 17760214.1 dated Nov. 15, 2018, 8 pages.

* cited by examiner

CLEANING COMPOSITION FOR LIQUID CRYSTAL ALIGNMENT LAYER AND MANUFACTURING METHOD OF LIQUID CRYSTAL ALIGNMENT LAYER USING THE SAME

CROSS-REFERENCE TO RELATED APPLICATION

This application is a 35 U.S.C. § 371 National Phase Entry Application from PCT/KR2017/000991, filed on Jan. 26, 2017, and designating the United States, which claims priority to and the benefit of Korean Patent Application No. 10-2016-0025873 filed in the Korean Intellectual Property Office on Mar. 3, 2016, the entire contents of which are incorporated herein by reference.

TECHNICAL FIELD

The present invention relates to a cleaning composition for a liquid crystal alignment layer capable of increasing anisotropy of a liquid crystal alignment layer in a process of manufacturing a liquid crystal alignment layer formed by using a liquid crystal alignment agent and suppressing a non-uniformity problem occurring in a treatment process thereof, a manufacturing method of a liquid crystal alignment layer including a cleaning method using the same, and a liquid crystal display device including the liquid crystal alignment layer manufactured by the manufacturing method.

BACKGROUND ART

In a liquid crystal display device, a liquid crystal alignment layer plays a role of aligning liquid crystals in a predetermined direction. Specifically, the liquid crystal alignment layer acts as a director for arrangement of liquid crystal molecules, such that when the liquid crystals move due to an electric field to form an image, the liquid crystal alignment layer allows the liquid crystals to align in an appropriate direction. In general, it is necessary to uniformly align the liquid crystals in order to obtain uniform brightness and a high contrast ratio (CR) in the liquid crystal display device.

A rubbing method of applying a polymer layer such as polyimide to a substrate such as glass, and rubbing a surface of the polymer layer with a fiber such as nylon or polyester in a predetermined direction has been used as a conventional method of aligning the liquid crystals. However, the rubbing method may cause fine dust or electrostatic discharge (ESD) when the fiber and the polymer layer are rubbed, which may cause serious problems in manufacturing a liquid crystal panel.

In order to solve a problem of the rubbing method due to the friction, a UV alignment process has recently been used. The UV alignment process is a light alignment method in which anisotropy is induced on a polymer layer by light irradiation, and liquid crystals are aligned using the anisotropy. The UV alignment process may improve the CR and viewing angle due to improvement of alignment uniformity and a pretilt angle characteristic (about 0 degrees).

Meanwhile, the UV alignment process may be substituted for the rubbing process as a non-contact alignment process, but an additional cleaning process is required.

In a generally used cleaning process after conventional UV alignment processes, water or a lower alcohol such as ethanol or IPA is mainly used as a cleaning agent. However, when the treatment with water, ethanol, or IPA used as the cleaning agent is performed, there are problems that the liquid crystal alignment layer is non-uniform, etc., such that characteristics of the liquid crystal alignment layer are largely impaired.

Therefore, it is necessary to develop a new cleaning agent capable of preventing deterioration of the characteristics of the liquid crystal alignment layer after the UV alignment process, and in particular, capable of solving the non-uniformity problem of the liquid crystal alignment layer, and a cleaning method using the same.

DISCLOSURE

Technical Problem

The present invention has been made in an effort to provide a cleaning composition for a liquid crystal alignment layer, and a manufacturing method of a liquid crystal alignment layer using the same including a cleaning method of the liquid crystal alignment layer having advantages of increasing anisotropy of the liquid crystal alignment layer obtained by a UV light alignment method through cleaning a polymer surface, and suppressing non-uniformity occurring in a treatment process thereof.

The present invention has also been made in an effort to provide a liquid crystal display device including the liquid crystal alignment layer manufactured by the manufacturing method as described above.

An exemplary embodiment of the present invention provides a cleaning composition for a liquid crystal alignment layer including: tetrahydrofurfuryl alcohol or methyl 2-hydroxyisobutyrate, wherein the cleaning composition for a liquid crystal alignment layer is used for cleaning a UV-aligned liquid crystal alignment layer including polyimide or a polyimide precursor.

The cleaning composition may further include at least one compound selected from the group consisting of an alkylene glycol-based compound having a viscosity of 10 cP or less and a boiling point of at least 150° C. or more and a polar solvent having a viscosity of 5 cP or less and a boiling point of at least 100° C. or more.

The cleaning composition may include a) 100 wt % of the tetrahydrofurfuryl alcohol or the methyl 2-hydroxyisobutyrate, or b) 1 to 99 wt % of the compound a); and 0.1 to 99 wt % of at least one compound selected from the group consisting of an alkylene glycol-based compound and a polar solvent.

The cleaning composition may further include: 1 to 70 wt % of deionized water.

Another embodiment of the present invention provides a manufacturing method of a liquid crystal alignment layer, the manufacturing method including: forming a polyimide layer by coating and firing a liquid crystal alignment agent containing at least one polymer selected from the group consisting of a polyimide and a polyimide precursor on a substrate;

performing a UV alignment process by irradiating polarized radiation to the substrate on which the polyimide layer is formed;

cleaning a polymer surface on the substrate in which the UV alignment process is completed, using a cleaning composition; and drying the cleaned substrate, wherein the cleaning composition includes tetrahydrofurfuryl alcohol or methyl 2-hydroxyisobutyrate, and in the cleaning, an ionic byproduct including a UV decomposition product of the polyimide layer is washed and removed from the polymer surface of the polyimide layer by the cleaning composition.

The cleaning composition may further include at least one compound selected from the group consisting of an alkylene glycol-based compound having a viscosity of 10 cP or less and a boiling point of at least 150° C. or more and a polar solvent having a viscosity of 5 cP or less and a boiling point of at least 100° C. or more.

Preferably, the cleaning composition may include a) 100 wt % of a compound selected from the group consisting of the tetrahydrofurfuryl alcohol and the methyl 2-hydroxyisobutyrate, or b) 1 to 99 wt % of the compound a); and 0.1 to 99 wt % of at least one compound selected from the group consisting of an alkylene glycol-based compound and a polar solvent.

In addition, the cleaning composition may further include: 1 to 70 wt % of deionized water.

The alkylene glycol-based compound used in the cleaning composition may be at least one selected from the group consisting of diethyleneglycol tertbutyl ether, diethyleneglycol monomethyl ether, diethyleneglycol monoethyl ether, diethyleneglycol monobutyl ether, dipropyleneglycol monomethyl ether, dipropyleneglycol monoethyl ether, ethyleneglycol monomethyl ether, ethyleneglycol monobutyl ether, ethyleneglycol monoethyl ether, propyleneglycol monomethyl ether, and propyleneglycol monomethyl ether acetate. The polar solvent used in the cleaning composition may be at least one selected from the group consisting of ethyl lactate, butyl lactate, hydroxyl acid ester, N-methyl pyrrolidone, N-ethyl pyrrolidone, N-methyl formamide, 1,3-dimethyl-2-imidazolidinone, dimethylsulfoxide, dimethylacetamide, dimethylformamide, and tetramethylenesulfone.

Further, the firing in the forming of the polyimide layer may include a soft baking process or a hard baking process.

In addition, the polyimide precursor may include a repeating unit represented by Chemical Formula 1 below, and a repeating unit represented by Chemical Formula 2 below.

[Chemical Formula 1]

[Chemical Formula 2]

(in Chemical Formulas 1 and 2, $X^1$ and $X^2$ are each independently a quadrivalent organic group derived from a C4-C20 hydrocarbon, or a quadrivalent organic group in which at least one H is substituted with a halogen or at least one $-CH_2-$ is replaced with $-O-$, $-S-$, $-CO-$, or $-SO-$ so that oxygen atoms are not directly connected, in the quadrivalent organic group, $R^1$ to $R^4$ are each independently a hydrogen or a C1-C10 alkyl group, $R^5$ to $R^7$ are each independently halogen, a cyano group, a C2-C10 alkenyl group, a C1-C10 alkyl group, a C1-C10 alkoxy group, or a C1-C10 fluoroalkyl group, $L^1$ is $-O-$, $-O-CH_2-O-$, $-O-CH_2CH_2-O-$, or $-O-CH_2CH_2CH_2-O-$, p, q and r are each independently an integer of 0 to 4, and n is an integer of 1 or 2.)

The polyimide precursor may have a weight average molecular weight of 1,000 to 200,000 g/mol.

Further, in the performing of the UV alignment process, the substrate on which the polyimide layer is formed may be irradiated with ultraviolet light or visible light having a wavelength of 150 to 450 nm, and linearly polarized light may be irradiated in a vertical direction or an oblique direction to the alignment layer.

Yet another embodiment of the present invention provides a liquid crystal display device including the liquid crystal alignment layer manufactured by the manufacturing method as described above.

Advantageous Effects

In the cleaning process included after the UV alignment in the process of manufacturing the liquid crystal alignment layer, the cleaning composition including a specific solvent such as tetrahydrofurfuryl alcohol or the like may be used to easily remove ionic impurities on the polymer surface of the liquid crystal alignment layer. Therefore, according to the present invention, the anisotropy of the liquid crystal alignment layer may be increased, the non-uniformity occurring in the treatment process may be suppressed, and the impurities remaining on the alignment layer may be effectively removed. In addition, the present invention may provide the liquid crystal display device including the liquid crystal alignment layer capable of exhibiting not only high stability and reliability but also excellent alignment stability and electrical characteristics and maintaining an effect of improving the CR and viewing angle by the UV alignment process.

MODE FOR INVENTION

Hereinafter, the present invention is described in more detail. The terms and words used in the present specification and claims should not be interpreted as being limited to typical meanings or dictionary definitions, but should be interpreted as having meanings and concepts relevant to the technical scope of the present invention based on the rule according to which an inventor can appropriately define the concept of the terms in order to describe their own inventions in the best mode.

The term "including" used herein specifies specific characteristics, regions, integers, steps, operations, elements, and/or components, but it does not exclude the presence or the addition of other specific characteristics, regions, integers, steps, operations, elements, and/or components.

An exemplary embodiment of the present invention provides a cleaning composition for a liquid crystal alignment layer including: tetrahydrofurfuryl alcohol or methyl 2-hydroxyisobutyrate, wherein the cleaning composition for a liquid crystal alignment layer is used for cleaning a UV-aligned liquid crystal alignment layer including polyimide or a polyimide precursor.

Another exemplary embodiment of the present invention provides a manufacturing method of a liquid crystal alignment layer, the manufacturing method including: forming a polyimide layer by coating and firing a liquid crystal alignment agent containing at least one polymer selected from the group consisting of a polyimide and a polyimide precursor on a substrate; performing a UV alignment process by irradiating polarized radiation to the substrate on which the polyimide layer is formed; cleaning a polymer surface on the substrate in which the UV alignment process is completed, using a cleaning composition; and drying the cleaned substrate, wherein the cleaning composition includes tetrahydrofurfuryl alcohol or methyl 2-hydroxyisobutyrate, and in the cleaning, an ionic byproduct including a UV decomposition product of the polyimide layer is washed and removed from the polymer surface of the polyimide layer by the cleaning composition.

Hereinafter, the cleaning composition for a liquid crystal alignment layer and the manufacturing method of the liquid crystal alignment layer using the same of the present invention will be described in more detail.

In the present invention, a solvent having a specific structure is used as the cleaning composition in order to solve the non-uniformity problem occurring in the cleaning process of the conventional liquid crystal alignment after the UV alignment process in the process of manufacturing the liquid crystal alignment layer.

That is, it was confirmed in the present invention that anisotropy of the liquid crystal alignment layer was increased by irradiating a polyimide layer with polarized radiation, the polyimide layer being obtained by coating and firing a polyimide or a polyimide precursor, and then, performing a cleaning treatment using a cleaning agent including a specific solvent. Further, in the present invention, the non-uniformity problem of the liquid crystal alignment layer may be solved as compared to a case of treatment with water, ethanol, or IPA used as a conventional cleaning agent, and thus, characteristics of the liquid crystal alignment layer may be maintained. Further, the specific alignment layer cleaning composition of the present invention is to clean impurities present on the polymer surface after alignment is completed, rather than clean an inorganic layer surface as in the prior art. That is, all of the conventional cleaning agents are used for cleaning the inorganic layer of the alignment layer. However, the cleaning composition of the present invention is characterized in that it is used for cleaning the polymer surface of the alignment layer which is unlike the conventional cleaning compositions generally used in cleaning a semiconductor device.

The manufacturing method of the liquid crystal alignment layer of the present invention includes forming a polyimide by coating and firing a liquid crystal alignment agent on a substrate, a UV alignment process of the substrate on which the polyimide layer is formed, a cleaning process, and a drying process (thermal baking). In addition, a cell laminating process may be performed after the drying process is completed.

The liquid crystal alignment layer is formed on the surface of the polyimide layer due to alignment achieved by the UV alignment process. Since a UV decomposition product is present on the surface of the alignment layer, the cleaning process using the cleaning agent is performed to remove the impurities from the polymer surface of the alignment layer.

Figure 1:
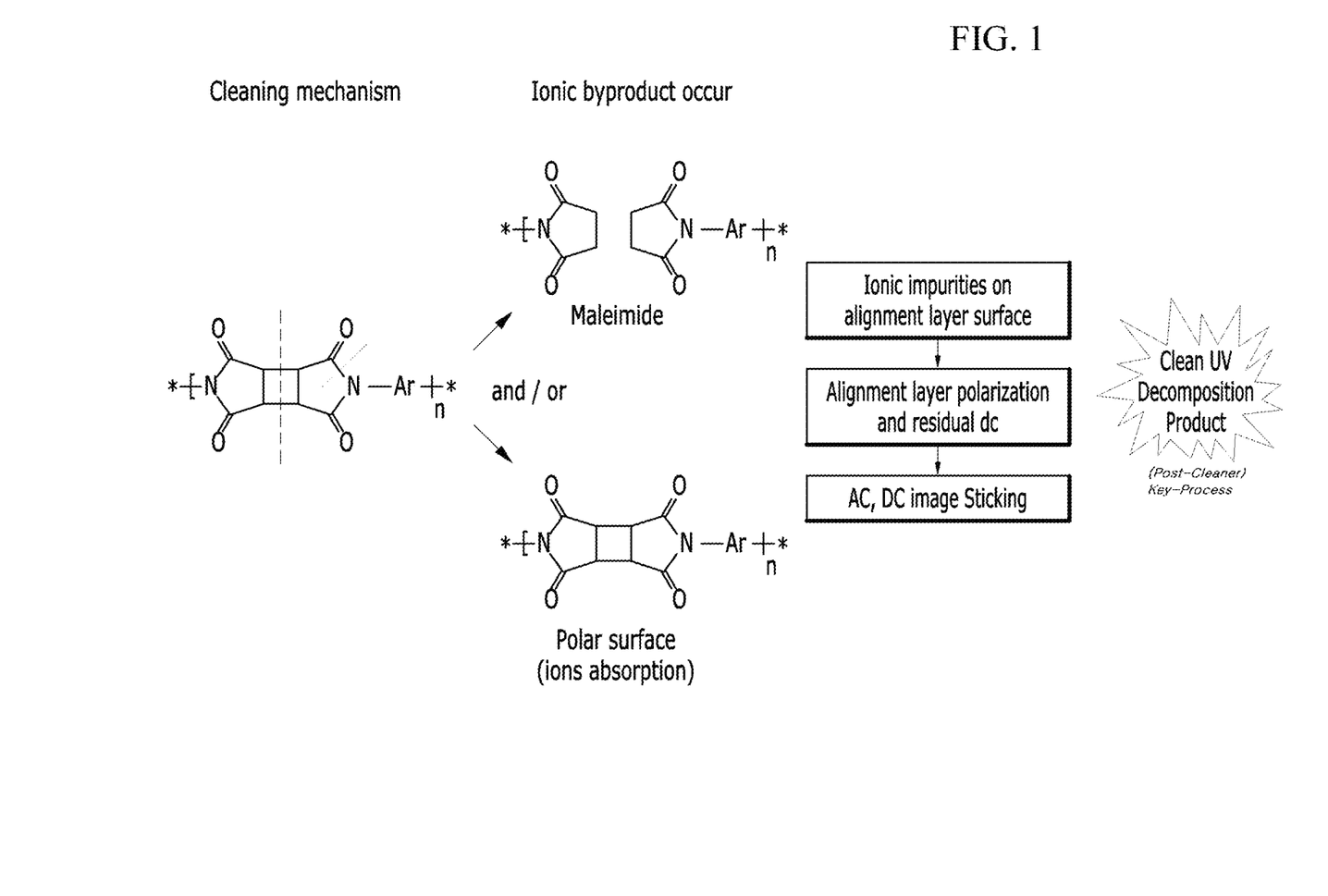
FIG. 1 schematically shows a cleaning mechanism after UV alignment in a manufacturing method of a liquid crystal alignment layer.

In addition, the cleaning mechanism of the liquid crystal alignment layer is as shown in FIG. 1. As shown in FIG. 1, when UV light is irradiated to the polyimide layer, ionic byproducts occur on the surface of the alignment layer, and AC and DC image sticking problems are caused. Therefore, it is necessary to clean the UV decomposition product.

Accordingly, in the present invention, the cleaning composition including the specific cleaning component is used to effectively clean the UV decomposition product. Such a cleaning composition of the present invention is characterized by including a compound selected from the group consisting of tetrahydrofurfuryl alcohol and methyl 2-hydroxyisobutyrate as a main component.

These materials exhibit the same level of cleaning effect as each other, and it is more preferred to include tetrahydrofurfuryl alcohol. When the cleaning process is performed by increasing a temperature to 25 to 80° C. after a predetermined time (for example, 1 minute to 3 minutes), the tetrahydrofurfuryl alcohol may increase the cleaning effect.

In particular, the tetrahydrofurfuryl alcohol (hereinafter referred to as THFA) represented by Chemical Formula 1 below used in the present invention has both a hydrophilic group and a hydrophobic group in a structure thereof, thereby exhibiting good affinity with water and good miscibility with a solvent. In addition, since there is no reactivity with amines and water, the THFA has good solution stability.

[Chemical Formula 1]

Accordingly, the THFA may be used as the cleaning composition, thereby preventing deterioration in properties of the liquid crystal alignment layer (i.e., a light alignment layer) in the present invention as compared to the prior art. Accordingly, in the present invention, the liquid crystal alignment layer may be formed on the substrate using the polyimide or the precursor thereof, and then, the specific solvent may be used as the cleaning composition, and thus by-products remaining on the polymer surface of the liquid crystal alignment layer may be easily removed. By using the cleaning composition, the present invention may easily remove ionic impurities on the surface of the liquid crystal alignment layer, may solve the image sticking (IS), and may maintain an excellent degree of uniformity of the alignment layer.

Further, as the cleaning composition of the present invention, a) the compound selected from the group consisting of tetrahydrofurfuryl alcohol and methyl 2-hydroxyisobutyrate may be used alone in the total composition, but a mixture form further including b) an additional solvent may be used.

The additional solvent may further include at least one selected from the group consisting of an alkylene glycol-based compound having a viscosity of 10 cP or less and a boiling point of at least 150° C. or more and a polar solvent having a viscosity of 5 cP or less and a boiling point of at least 100° C. or more.

As a preferable example, the cleaning composition of the present invention may selectively include a combination of a mixture of THFA and an alkylene glycol-based compound; a mixture of THFA and a polar solvent; a mixture of THFA and deionized water; a mixture of THFA, an alkylene glycol-based compound, and a polar solvent; a mixture of THFA, an alkylene glycol-based compound, and deionized water; or a mixture of THFA, an alkylene glycol-based compound, a polar solvent, and deionized water.

In addition, the cleaning composition according to a preferred exemplary embodiment may include 100 wt % of a compound selected from the group consisting of tetrahydrofurfuryl alcohol and methyl 2-hydroxyisobutyrate, based on a total weight of the composition.

Further, the cleaning composition may include a) 100 wt % of a compound selected from the group consisting of tetrahydrofurfuryl alcohol and methyl 2-hydroxyisobutyrate, or b) 1 to 99 wt % of the compound a); and 0.1 to 99 wt % of at least one compound selected from the group consisting of an alkylene glycol-based compound and a polar solvent, based on the total weight of the composition. Here, in the mixture of b), 50% of the tetrahydrofurfuryl alcohol in the component a) may be preferred in consideration of the cleaning effect on the polymer surface. More preferably, the cleaning composition may include a) 100 wt % of the tetrahydrofurfuryl alcohol or the methyl 2-hydroxyisobutyrate, or b) 1 to 99 wt % of the compound a); and 0.1 to 99 wt % of at least one compound selected from the group consisting of an alkylene glycol-based compound and a polar solvent, based on the total weight of the composition.

The cleaning composition may further include: 1 to 70 wt % of deionized water.

The cleaning composition of the present invention may include a) 20 to 80 wt % of the tetrahydrofurfuryl alcohol; and b) 20 to 80 wt % of at least one selected from the group consisting of an alkylene glycol-based compound and a polar solvent, based on the total weight of the composition.

According to another preferable exemplary embodiment, the cleaning composition may include a) 20 to 70 wt % of the tetrahydrofurfuryl alcohol; b) 20 to 70 wt % of at least one selected from the group consisting of the alkylene glycol-based compound and the polar solvent; and c) 10 to 60 wt % of deionized water, based on the total weight of the composition.

The alkylene glycol-based compound may be at least one selected from the group consisting of diethyleneglycol tert-tbutyl ether, diethyleneglycol monomethyl ether, diethyleneglycol monoethyl ether, diethyleneglycol monobutyl ether, dipropyleneglycol monomethyl ether, dipropyleneglycol monoethyl ether, ethyleneglycol monomethyl ether, ethyleneglycol monobutyl ether, ethyleneglycol monoethyl ether, propyleneglycol monomethyl ether, and propyleneglycol monomethyl ether acetate.

In addition, the polar solvent may be at least one selected from the group consisting of ethyl lactate, butyl lactate, hydroxyl acid ester, N-methyl pyrrolidone, N-ethyl pyrrolidone, N-methyl formamide, 1,3-dimethyl-2-imidazolidinone, dimethylsulfoxide, dimethylacetamide, dimethylformamide, and tetramethylenesulfone.

In addition, the deionized water used in the present invention may be obtained by a general ion exchange resin method.

Here, in the present invention, as shown in FIG. 1, if necessary, a cleaning process of the polyimide layer may be further included before UV alignment, and the process is not limited, but may be performed by a method that is well-known in the art.

Further, in the present invention, the cleaning process may be performed by immersing a substrate on which the liquid crystal alignment layer is formed in the above-described cleaning composition for a predetermined time, or by spraying the cleaning composition onto the substrate. Specifically, the cleaning process may be performed by immersing the substrate on which the coating layer is formed at a temperature of about 25° C. for about 1 minute to 10 minutes.

The immersing process may be performed at a temperature of about 25 to 30° C. for about 3 to 30 minutes, and a cleaning power may be confirmed in this process. In addition, in order to confirm etching and reliability, the immersing process may be performed at a temperature of about 25 to 30° C. for about 10 to 24 hours.

Meanwhile, the method of manufacturing a liquid crystal alignment layer in the present invention may be performed by various methods known in the art to which the present invention pertains, except that the specific cleaning composition is used in the cleaning process.

As a non-limiting example, the liquid crystal alignment layer may be formed by coating and firing a liquid crystal alignment agent to be described later on a substrate, and then irradiating light thereto. Here, the firing and the light irradiation may be simultaneously performed, and the light irradiation may be omitted.

That is, the forming of the polyimide may be performed, as described above, by coating and firing a liquid crystal alignment agent containing at least one polymer selected from the group consisting of a polyimide and a polyimide precursor on a substrate.

Further, the firing in the forming of the polyimide layer includes a soft baking process or a hard baking process. However, the firing process of the present invention is not limited to a great extent since all the general methods are usable. In addition, both the soft bake process and the hard bake process may be performed, if necessary.

Specifically, the above-described liquid crystal alignment agent is coated to a substrate on which the liquid crystal alignment layer is to be formed. As the substrate, all of various substrates used in the technical field to which the present invention pertains may be used. As the coating method, all of various methods known in the technical field to which the present invention pertains may be employed. As a non-limiting example, the liquid crystal alignment agent may be coated by methods such as screen printing, offset printing, flexo printing, inkjet printing, etc.

Then, the previously manufactured coating layer is fired. The firing may be performed at about 50° C. to 300° C. by a heating means such as a hot plate, a hot-air circulation furnace, an infrared ray furnace, or the like. In addition, when the soft baking process is performed, the process may be performed at a temperature within about 70° C. for 100 seconds to 5 minutes. When the hard baking process is performed, the process may be performed at a temperature within about 230° C. for 1000 seconds.

Through the firing process, the repeating units represented by Chemical Formulas 1 and 2 in the polymer included in the liquid crystal alignment agent may be imidized. The polymer may include the repeating unit represented by Chemical Formula 2 which is previously imidized, thereby exhibiting a remarkably improved imide conversion ratio as compared with the prior art.

After the firing process, the fired layer manufactured above may be irradiated with light according to a desired alignment direction to provide the liquid crystal alignment property. That is, as polarized radiation is irradiated to the liquid crystal alignment layer obtained using the polyimide or the precursor thereof, the alignment layer reacts anisotropically to achieve light alignment. Therefore, the irradiating of the polarized radiation may be performed by irradiating ultraviolet rays or visible rays having a wavelength of 150 to 450 nm to the liquid crystal alignment layer, or irradiating linearly polarized light in a vertical direction or an oblique direction to the alignment layer. An exposure amount at the time of the irradiation with ultraviolet rays may be about 0.25 to 1 J/cm$^2$.

The drying of the cleaned substrate after completion of the cleaning process may be performed by spin drying or oven drying at a temperature of about 230° C. for 1000 seconds, but these conditions are not limited thereto.

In addition, a cell laminating process may include a dummy cell laminating process and an IPC cell laminating process, and the method is not limited.

Meanwhile, in the present invention, the forming of the polyimide layer may be performed by coating and firing a liquid crystal alignment agent containing at least one polymer selected from the group consisting of polyimide and a polyimide precursor on a substrate.

A composition of the liquid crystal alignment agent may be provided through various methods known in the technical field to which the present invention pertains.

As a non-limiting example, the liquid crystal alignment agent may be provided by dissolving or dispersing the above-described polymer in an organic solvent.

Specific examples of the organic solvent may include N,N-dimethylformamide, N,N-dimethylacetamide, N-methyl-2-pyrrolidone, N-methylcaprolactam, 2-pyrrolidone, N-ethylpyrrolidone, N-vinylpyrrolidone, dimethyl sulfoxide, tetramethylurea, pyridine, dimethyl sulfone, hexamethyl sulfoxide, γ-butyrolactone, 3-methoxy-N,N-dimethylpropanamide, 3-ethoxy-N,N-dimethylpropanamide, 3-butoxy-N,N-dimethylpropanamide, 1,3-dimethyl-imidazolidinone, ethyl amyl ketone, methyl nonyl ketone, methyl ethyl ketone, methyl isoamyl ketone, methyl isopropyl ketone, cyclohexanone, ethylene carbonate, propylene carbonate, diglyme, 4-hydroxy-4-methyl-2-pentanone, etc. These examples may be used alone or in combination.

In addition, the liquid crystal alignment agent may further include other components in addition to the polyimide-based polymer and the organic solvent. As a non-limiting example, when the liquid crystal alignment agent is coated, an additive capable of improving uniformity of layer thickness and surface smoothness, improving an adhesion property between the liquid crystal alignment layer and the substrate, changing a dielectric constant or conductivity of the liquid crystal alignment layer, or increasing denseness of the liquid crystal alignment layer may further be included. Examples of the additive may include various solvents, surfactants, silane-based compounds, dielectrics, crosslinking compounds, etc.

In addition, a polymer structure of the polyimide or the precursor thereof used for obtaining the liquid crystal alignment agent is not particularly limited, and any structure may be used as long as it is capable of forming a polyimide-based polymer layer that is well known in the art.

For example, an aromatic diamine compound having a functional group, an aromatic tetracarboxylic acid anhydride having a functional group, etc., may be used. In addition, the polyimide layer may be manufactured by including a repeating unit of polyamic acid.

In addition, preferably, the polyimide precursor in the present invention may include a repeating unit represented by Chemical Formula 1 below, and a repeating unit represented by Chemical Formula 2 below.

Further, the polyimide may be a polymer in which at least a part of the repeating units of the polyimide precursor is imidized.

Preferably, the polyimide precursor may include the repeating unit represented by Chemical Formula 1 in a content of 50 to 95 mol %, and the repeating unit represented by Chemical Formula 2 in a content of 5 to 50 mol %.

[Chemical Formula 1]

[Chemical Formula 2]

(In Chemical Formulas 1 and 2, $X^1$ and $X^2$ are each independently a quadrivalent organic group derived from a C4-C20 hydrocarbon, or a quadrivalent organic group in which at least one H is substituted with a halogen or at least one —CH$_2$— is replaced with —O—, —S—, —CO— or —SO— so that oxygen atoms are not directly connected, in the quadrivalent organic group, $R^1$ to $R^4$ are each independently hydrogen or a C1-C10 alkyl group, $R^5$ to $R^7$ are each independently a halogen, a cyano group, a C2-C10 alkenyl group, a C1-C10 alkyl group, a C1-C10 alkoxy group, or a C1-C10 fluoroalkyl group, $L^1$ is —O—, —O—CH$_2$—O—, —O—CH$_2$CH$_2$—O—, or —O—CH$_2$CH$_2$CH$_2$—O—, p, q and r are each independently an integer of 0 to 4, and n is an integer of 1 or 2.)

For reference, the following terms may be defined as follows, unless otherwise specified in the present specification.

The C4-C20 hydrocarbon may be a C4-C20 alkane, a C4-C20 alkene, a C4-C20 alkyne, a C4-C20 cycloalkane, a C4-C20 cycloalkene, a C6-C20 arene, or at least one cyclic hydrocarbon among them may be a fused ring sharing two or more atoms, or at least one hydrocarbon among them may be chemically bonded hydrocarbon. Specific examples of the C4-C20 hydrocarbon may include n-butane, cyclobutane, 1-methylcyclobutane, 1,3-dimethylcyclobutane, 1,2,3,4-tetramethylcyclobutane, cyclopentane, cyclohexane, cycloheptane, cyclooctane, cyclohexene, 1-methyl-3-ethyl-cyclohexene, bicyclohexyl, benzene, biphenyl, diphenylmethane, 2,2-diphenylpropane, 1-ethyl-1,2,3,4-tetrahydronaphthalene or 1,6-diphenylhexane, etc.

The C1-C10 alkyl group may be a linear alkyl group, a branched alkyl group or a cyclic alkyl group. Specifically, the C1-C10 alkyl group may be a C1-C10 linear alkyl group; a C1-C5 linear alkyl group; a C3-C10 branched or cyclic alkyl group; or a C3-C6 branched or cyclic alkyl group. More specifically, examples of the C1-C10 alkyl group may include a methyl group, an ethyl group, an n-propyl group, an iso-propyl group, an n-butyl group, an iso-butyl group, a tert-butyl group, an n-pentyl group, an iso-pentyl group, a neo-pentyl group, a cyclohexyl group, etc.

The C1-C10 alkoxy group may be a linear alkoxy group, a branched alkoxy group or a cyclic alkoxy group. Specifically, the C1-C10 alkoxy group may be a C1-C10 linear alkoxy group, a C1-C5 linear alkoxy group, a C3-C10 branched or cyclic alkoxy group, or a C3-C6 branched or cyclic alkoxy group. More specifically, examples of the C1-C10 alkoxy group may include a methoxy group, an ethoxy group, an n-propoxy group, an iso-propoxy group, an n-butoxy group, an iso-butoxy group, a tert-butoxy group, an n-pentoxy group, an iso-pentoxy group, a neo-pentoxy group, a cycloheptoxy group, etc.

The C1-C10 fluoroalkyl group may be obtained by substituting at least one hydrogen of the C1-C10 alkyl group with fluorine.

The C2-C10 alkenyl group may be a linear alkenyl group, a branched alkenyl group or a cyclic alkenyl group. Specifically, the C2-C10 alkenyl group may be a C2-C10 linear alkenyl group, a C2-C5 linear alkenyl group, a C3-C10 branched alkenyl group, a C3-C6 branched alkenyl group, a C5-C10 cyclic alkenyl group, or a C6-C8 cyclic alkenyl group. More specifically, examples of the C2-C10 alkenyl group may include an ethenyl group, a propenyl group, a butenyl group, a pentenyl group, a cyclohexenyl group, etc.

The halogen may be fluorine (F), chlorine (Cl), bromine (Br) or iodine (I).

A multivalent organic group derived from any compound means a residue in a form in which a plurality of hydrogen atoms bonded to the compound are removed. As an example, the quadrivalent organic group derived from cyclobutane means a residue in a form in which any four hydrogen atoms bonded to the cyclobutane are removed.

In the present specification, -* in the chemical formula means a residue in a form in which hydrogen of a corresponding site is removed. For example, means any one among residues in a form in which four hydrogen atoms bonded to carbon Nos. 1, 2, 3, and 4 of cyclobutane are removed, that is, quadrivalent organic groups derived from cyclobutane.

Further, the polyimide precursor in the present specification may also refer to polyamic acid or polyamic acid ester capable of providing a polyimide under appropriate conditions.

More specifically, the repeating unit represented by Chemical Formula 1 may be a repeating unit produced by reacting linear diamine with tetracarboxylic acid or an anhydride thereof. The polyimide precursor according to an exemplary embodiment may include the repeating unit derived from the linear diamine as shown in Chemical Formula 1, thereby providing a liquid crystal alignment layer having remarkably improved liquid crystal alignment property and reliability.

Further, the repeating unit represented by Chemical Formula 1 may include a divalent organic group derived from the linear diamine. Accordingly, two amino groups in the repeating unit represented by Chemical Formula 1 may be bonded at positions 1 and 4 of benzene (for example, Chemical Formula 1-1) or at positions 1 and 3 of benzene (for example, Chemical Formula 1-2), or at positions 3 and 3' of biphenyl (for example, Chemical Formula 1-3) or positions 4 and 4' of biphenyl (for example, Chemical Formula 1-4) or positions 3 and 4' of biphenyl (for example, Chemical Formula 1-5), respectively. Specific examples of the repeating unit represented by Chemical Formula 1 may have the same structure as those of the following Chemical Formulas 1-1 to 1-5.

[Chemical Formula 1-1]

[Chemical Formula 1-2]

[Chemical Formula 1-3]

[Chemical Formula 1-4]

[Chemical Formula 1-5]

In Chemical Formulas 1-1 to 1-5, $X^1$, $R^1$, $R^2$, $R^5$ and p are the same as defined in Chemical Formula 1.

When the repeating unit represented by Chemical Formula 1 is at least one repeating unit represented by Chemical Formulas 1-1 and 1-4, it is possible to provide a polyimide precursor capable of implementing a more stable liquid crystal alignment property.

Meanwhile, the repeating unit represented by Chemical Formula 2 may provide a liquid crystal alignment property to the polyimide prepared from the polyimide precursor according to the exemplary embodiment, even by light irradiation with a small exposure amount. Accordingly, alignment stability and reliability by the repeating unit represented by Chemical Formula 1 may be implemented without undesired side reactions. That is, it is possible to provide a liquid crystal alignment layer having excellent general physical properties of a light alignment layer while implementing excellent alignment stability such as through a rubbing alignment layer, by the repeating units represented by Chemical Formulas 1 and 2.

In order to implement excellent general physical properties of the light alignment layer while implementing such excellent alignment stability and reliability, the polyimide precursor according to the exemplary embodiment may include 50 to 95 mol % of the repeating unit represented by Chemical Formula 1 and 5 to 50 mol % of the repeating unit represented by Chemical Formula 2 with regard to total repeating units.

The polyimide precursor according to an exemplary embodiment may be prepared from tetracarboxylic acid or an anhydride thereof known in the technical field to which the present invention pertains. Therefore, in the repeating units represented by Chemical Formulas 1 and 2, $X^1$ and $X^2$ may be various quadrivalent organic groups as described above.

As an example, $X^1$ and $X^2$ may each independently be a quadrivalent organic group described in Chemical Formula 3 below.

[Chemical Formula 3]

In Chemical Formula 3,
$R^8$ to $R^{11}$ are each independently hydrogen or a C1-C6 alkyl group, and
$L^2$ is —O—, —S—, —CO—, —SO—, —C(CF$_3$)$_2$— or —COO—CH$_2$CH$_2$—OCO—.

At least a part of $X^1$ and $X^2$ may be a quadrivalent organic group represented by Chemical Formula 3-1 below in Chemical Formula 3.

[Chemical Formula 3-1]

In Chemical Formula 3-1, $R^8$ to $R^{11}$ are the same as defined in Chemical Formula 3.

As described above, the repeating unit represented by Chemical Formula 1 wherein $X^1$ is a quadrivalent organic group represented by Chemical Formula 3-1 or the repeating unit represented by Chemical Formula 2 wherein $X^2$ is a quadrivalent organic group represented by Chemical Formula 3-1 may be easily decomposed by light irradiation to easily implement an excellent liquid crystal alignment property. In order to more effectively ensure this effect, the sum of the repeating unit represented by Chemical Formula 1 wherein $X^1$ is a quadrivalent organic group represented by Chemical Formula 3-1 and the repeating unit represented by Chemical Formula 2 wherein $X^2$ is a quadrivalent organic group represented by Chemical Formula 3-1 may be controlled to 60 to 100 mol % with regard to the total repeating units.

The polyimide precursor according to an exemplary embodiment may be polyamic acid or polyamic acid ester. When the polyimide precursor is the polyamic acid, in the repeating units represented by Chemical Formulas 1 and 2, $R^1$ to $R^4$ may be hydrogen, and when the polyimide precursor is the polyamic acid ester, at least a part of $R^1$ to $R^4$ may be a C1-C10 alkyl group.

Meanwhile, in the repeating units represented by Chemical Formulas 1 and 2, a phenylene group derived from diamine may be substituted with $R^5$, $R^6$ or $R^7$. In addition, hydrogen may be bonded to carbon which is not substituted with $R^5$, $R^6$ or $R^7$ in the phenylene group. Each $R^5$ in the plurality of repeating units represented by Chemical Formula 1 may be the same as or different from each other, and similarly, each $R^6$ and $R^7$ in the plurality of repeating units represented by Chemical Formula 2 may be the same as or different from each other.

The polyimide precursor according to an exemplary embodiment may be prepared to have an appropriate degree of polymerization according to desired physical properties. As an example, the polyimide precursor may be prepared to have a weight average molecular weight of 1,000 to 200,000 g/mol. It is possible to provide a liquid crystal alignment layer exhibiting good general physical properties within such a range.

Meanwhile, according to yet another exemplary embodiment of the present invention, a liquid crystal display device including the liquid crystal alignment layer manufactured by the manufacturing method as described above is provided.

That is, according to the above-described method, after cleaning the substrate on which the liquid crystal alignment layer is formed, the present invention may manufacture the liquid crystal alignment layer including the liquid crystal alignment agent, and the liquid crystal alignment layer may be applied to manufacture the liquid crystal display device.

The above phrase "the liquid crystal alignment layer including the liquid crystal alignment agent" means that the liquid crystal alignment layer includes the liquid crystal alignment agent itself or the liquid crystal alignment layer includes a product obtained through a chemical reaction of the liquid crystal alignment agent.

The liquid crystal alignment layer may be introduced into a liquid crystal cell by a known method, and similarly, the liquid crystal cell may be introduced into the liquid crystal display device by a known method. The liquid crystal alignment layer may implement excellent stability together with excellent physical properties since the above-described cleaning method exhibiting excellent cleaning power is used. Thus, the liquid crystal display device capable of exhibiting high reliability is provided.

In addition, the liquid crystal display device described in the present invention may be manufactured by a method that is well known in the art, except for the liquid crystal alignment layer provided by the above-described method, and thus, detailed descriptions thereof will be omitted.

Hereinafter, action and effects of the present invention are described by specific examples of the present invention in more detail. However, these examples are provided by way of example, and therefore, should not be construed as limiting the scope of the present invention.

Comparative Examples 1 to 12 and Examples 1 to 34

Preparation of Liquid Crystal Alignment Agent and Liquid Crystal Cell (1) Preparation of Liquid Crystal Alignment Agent A polyimide polymer (Mw: 23000 to 27000) was dissolved in a mixed solvent to have a ratio of 5 wt % of solids the mixed solvent containing NMP and n-butoxyethanol at a weight ratio of 8:2. Then, the obtained solution was pressure-filtered through a filter having a pore size of 0.2 μm and made of a poly(tetrafluorene ethylene) material to prepare a liquid crystal alignment agent.

(2) Preparation of Liquid Crystal Cell

A liquid crystal cell was prepared by the following method using the liquid crystal alignment agent prepared above.

A substrate (lower plate) in which comb-shaped IPS (in-plane switching) mode ITO electrode patterns having a thickness of 60 nm, an electrode width of 3 μm and a gap between electrodes of 6 μm were formed on a rectangular glass substrate having a size of 2.5 cm×2.7 cm and a glass substrate (upper plate) having no electrode pattern thereon were coated with the liquid crystal alignment agent by a spin coating method, respectively.

Subsequently, the substrate coated with the liquid crystal alignment agent was placed and dried on a hot plate at about 70° C. for 1000 seconds, and subjected to hard baking in an oven at about 230° C. for 1000 seconds to obtain a polyimide coating layer having a thickness of 0.1 μm.

In order to align the thus-obtained coating layer, ultraviolet rays of 254 nm were irradiated at an exposure amount of 0.25 to 1 J/cm$^2$ using a light exposer having a linear polarizer to each of the coating layers of the upper plate and the lower plate.

Then, the cleaning compositions of Comparative Examples 1 to 12 and Examples 1 to 34 were prepared by mixing respective components of Tables 1 to 7. Next, the substrate on which the coating layer was formed was immersed in each of the cleaning compositions of Examples and Comparative Examples at a temperature of 25° C. for about 5 minutes, and thus, a process of cleaning the substrate was performed.

When the cleaning process was completed, the substrate was dried in an oven at 230° C. for 1000 seconds.

Then, a sealing agent impregnated with ball spacers having a size of 3 μm was coated to the edge of the upper plate of the substrate except at a liquid crystal injection hole. Next, alignment layers formed on the upper plate and the lower plate were arranged so that alignment directions were parallel to each other while facing each other, and then, the upper and lower plates were laminated and the sealing agent was cured to manufacture an empty cell. Subsequently, liquid crystal was injected into the empty cell to manufacture an IPS mode liquid crystal cell.

Experimental Example

<Evaluation of Characteristics of Liquid Crystal Alignment Layer>

Anisotropy, layer uniformity, black level, and AC residual image variation for the liquid crystal alignment layer cleaned using the cleaning composition used in Examples and Comparative Examples were measured by the following methods. In addition, results thereof are shown in Tables 1 to 6.

(1) Evaluation of Anisotropy

The anisotropy of the liquid crystal alignment layer was evaluated by the AxoStep method.

(Evaluation Standard)

1: Decrease in anisotropy value by 10% or more after cleaning

2: Decrease in anisotropy value within 10% after cleaning

3: Same anisotropy value as compared to before cleaning

4: Increase in anisotropy value within 10% after cleaning

5: Increase in anisotropy value by 10% or more after cleaning (2) Evaluation of Layer Uniformity The layer uniformity of the liquid crystal alignment layer was evaluated by the AFM method.

(Evaluation Standard)
1: Increase in surface roughness value by 10% or more after cleaning
2: Increase in surface roughness value within 10% after cleaning
3: Same surface roughness value as compared to before cleaning
4: Decrease in surface roughness value within 10% after cleaning
5: Decrease in surface roughness value by 10% or more after cleaning (3) Evaluation of Black Level The black level of the liquid crystal alignment layer was evaluated by the PR-880 method.

(Evaluation Standard)
1: Increase in black level by 10% or more after cleaning
2: Increase in black level within 10% after cleaning
3: Same black level as compared to before cleaning
4: Decrease in black level within 10% after cleaning
5: Decrease in black level by 10% or more after cleaning (4) Evaluation of AC Residual Image Variation The AC residual image variation of the liquid crystal alignment layer was evaluated by the PR-800 method after a voltage of 12V AC was applied at 60° C. for 24 hours.

(Evaluation Standard)
1: Level at which a change of AC residual image variation after cleaning is 100% or more
2: Level at which a change of AC residual image variation after cleaning is 30% or more
3: Same AC residual image variation (20% variation) as compared to before cleaning
4: Level at which a change of AC residual image variation after cleaning is within 10%
5: Level at which a change of AC residual image variation after cleaning is within 5%

TABLE 1

| | | Comparative Example | | | | |
|---|---|---|---|---|---|---|
| | | 1 | 2 | 3 | 4 | 5 |
| Alcohol | THFA | | | | | |
| | IPA | 100 | | | | |
| | EtOH | | 100 | | | |
| | MeOH | | | 100 | | |
| Alkylene glycol-based | MDG | | | | 100 | |
| | MG | | | | | |
| | EDG | | | | | |
| | EG | | | | | |
| | BDG | | | | | |
| | BG | | | | | |
| Polar solvent | NMP | | | | | |
| | NEP | | | | | |
| | EL | | | | | 100 |
| | HBM | | | | | |
| | IP-EL | | | | | |
| | BL | | | | | |
| DI | | | | | | |
| Sum | | 100 | 100 | 100 | 100 | 100 |
| Anisotropy | | 3 | 2 | 2 | 2 | 3 |
| Layer uniformity | | 3 | 3 | 3 | 3 | 4 |
| Black level | | 3 | 2 | 2 | 2 | 4 |
| AC residual image variation ratio | | 4 | 2 | 2 | 2 | 4 |

Note)
THFA: Tetrahydrofurfuryl alcohol
IPA: Isopropyl alcohol
MDG: Diethyleneglycol monomelhyl ether (methyl carbitol)
MG: Ethyleneglycol monomelhyl ether
EDG: Diethyleneglycol monoethyl ether (ethyl carbitol)
EG: Ethyleneglycol monoethyl ether
BDG: Diethyleneglycol monobutyl ether (butyl carbitol)
BG: Ethyleneglycol monobutyl ether
NMP: N-methyl pyrrolidone
NEP: N-ethyl pyrrolidone
HBM: Methyl, 2-hydroxyisobutyrate
IP-EL: Isopropyl lactate
BL: Butyl lactate

TABLE 2

| | | Comparative Example | | | | | | |
|---|---|---|---|---|---|---|---|---|
| | | 6 | 7 | 8 | 9 | 10 | 11 | 12 |
| Alcohol | THFA | | | | | | | |
| | IPA | | | | | | | |
| | EtOH | | | | | | | |
| | MeOH | | | | | | | |
| Alkylene glycol-based | MDG | | | | | | | |
| | MG | 100 | | | | | | |
| | EDG | | 100 | | | | | |
| | EG | | | 100 | | | | |
| | BDG | | | | 100 | | | |
| | BG | | | | | 100 | | |
| Polar solvent | NMP | | | | | | 100 | |
| | NEP | | | | | | | 100 |
| | EL | | | | | | | |
| | HBM | | | | | | | |
| | IP-EL | | | | | | | |
| | BL | | | | | | | |
| DI | | | | | | | | |
| Sum | | 100 | 100 | 100 | 100 | 100 | 100 | 100 |
| Anisotropy | | 3 | 4 | 4 | 2 | 2 | 1 | 1 |
| Layer uniformity | | 4 | 4 | 4 | 3 | 3 | 1 | 1 |
| Black level | | 4 | 4 | 4 | 2 | 4 | 1 | 1 |
| AC residual image variation ratio | | 4 | 4 | 4 | 2 | 4 | 1 | 1 |

TABLE 3

| | | Example | | | | | | |
|---|---|---|---|---|---|---|---|---|
| | | 1 | 2 | 3 | 4 | 5 | 6 | 7 |
| Alcohol | THFA | 100 | 50 | 50 | | | 50 | 50 |
| | IPA | | | | | | | |
| | EtOH | | | | | | | |
| | MeOH | | | | | | | |
| Alkylene glycol-based | MDG | | | 50 | | | | |
| | MG | | | | | | 50 | |
| | EDG | | | | 50 | | | 50 |
| | EG | | | | | | | |
| | BDG | | | | | | | |
| | BG | | | | | | | |
| Polar solvent | NMP | | | | | | | |
| | NEP | | | | | | | |
| | EL | | | | | | | |
| | HBM | | | | 50 | 100 | | |
| | IP-EL | | | | | | | |
| | BL | | | | | | | |
| DI | | | 50 | | | | | |
| Sum | | 100 | 100 | 100 | 100 | 100 | 100 | 100 |
| Anisotropy | | 5 | 5 | 5 | 5 | 5 | 5 | 5 |
| Layer uniformity | | 5 | 5 | 5 | 5 | 5 | 5 | 5 |
| Black level | | 5 | 5 | 5 | 5 | 5 | 5 | 5 |
| AC residual image variation ratio | | 5 | 5 | 5 | 5 | 5 | 5 | 5 |

TABLE 4

| | | Example | | | | | |
|---|---|---|---|---|---|---|---|
| | | 8 | 9 | 10 | 11 | 12 | 13 |
| Alcohol | THFA | 50 | 50 | | | | |
| | IPA | | | | | | |
| | EtOH | | | | | | |
| | MeOH | | | | | | |
| Alkylene glycol-based | MDG | | | | | | |
| | MG | | | | | | |
| | EDG | | | | | | |
| | EG | 50 | | 50 | | | |
| | BDG | | 50 | | 50 | | |
| | BG | | | | | | |
| Polar solvent | NMP | | | | | 50 | |
| | NEP | | | | | | 50 |
| | EL | | | | | | |
| | HBM | | | 50 | 50 | 50 | 50 |
| | IP-EL | | | | | | |
| | BL | | | | | | |
| DI | | | | | | | |
| Sum | | 100 | 100 | 100 | 100 | 100 | 100 |
| Anisotropy | | 5 | 5 | 5 | 5 | 5 | 5 |
| Layer uniformity | | 5 | 5 | 5 | 5 | 5 | 5 |
| Black level | | 5 | 5 | 5 | 5 | 5 | 5 |
| AC residual image variation ratio | | 5 | 5 | 5 | 5 | 5 | 5 |

TABLE 5

| | | Example | | | | | | |
|---|---|---|---|---|---|---|---|---|
| | | 14 | 15 | 16 | 17 | 18 | 19 | 20 |
| Alcohol | THFA | 50 | 50 | 50 | 50 | 50 | 50 | 50 |
| | IPA | | | | | | | |
| | EtOH | | | | | | | |
| | MeOH | | | | | | | |
| Alkylene glycol-based | MDG | | | | | | | |
| | MG | | | | | | | |
| | EDG | | | | | | | |
| | EG | | | | | | | |
| | BDG | | | | | | | |
| | BG | 50 | | | | | | |
| Polar solvent | NMP | | 50 | | | | | |
| | NEP | | | 50 | | | | |
| | EL | | | | 50 | | | |
| | HBM | | | | | 50 | | |
| | IP-EL | | | | | | 50 | |
| | BL | | | | | | | 50 |
| DI | | | | | | | | |
| Sum | | 100 | 100 | 100 | 100 | 100 | 100 | 100 |
| Anisotropy | | 5 | 5 | 5 | 5 | 5 | 5 | 5 |
| Layer uniformity | | 5 | 5 | 5 | 5 | 5 | 5 | 5 |
| Black level | | 5 | 5 | 5 | 5 | 5 | 5 | 5 |
| AC residual image variation ratio | | 5 | 5 | 5 | 5 | 5 | 5 | 5 |

TABLE 6

| | | Example | | | | | | |
|---|---|---|---|---|---|---|---|---|
| | | 21 | 22 | 23 | 24 | 25 | 26 | 27 |
| Alcohol | THFA | 50 | 50 | 50 | 50 | 50 | 50 | 50 |
| | IPA | | | | | | | |
| | EtOH | | | | | | | |
| | MeOH | | | | | | | |
| Alkylene glycol-based | MDG | | | | | | | |
| | MG | 20 | | | | | | |
| | EDG | | 20 | | | | | |
| | EG | | | 20 | | | | |
| | BDG | | | | 20 | | | |
| | BG | | | | | 20 | | |
| Polar solvent | NMP | | | | | | 20 | |
| | NEP | | | | | | | 20 |
| | EL | 30 | 30 | 30 | 30 | 30 | 30 | 30 |
| | HBM | | | | | | | |
| | IP-EL | | | | | | | |
| | BL | | | | | | | |
| DI | | | | | | | | |
| Sum | | 100 | 100 | 100 | 100 | 100 | 100 | 100 |
| Anisotropy | | 2 | 2 | 5 | 5 | 5 | 5 | 5 |
| Layer uniformity | | 3 | 3 | 5 | 5 | 5 | 5 | 5 |
| Black level | | 2 | 2 | 5 | 5 | 5 | 5 | 5 |
| AC residual image variation ratio | | 2 | 2 | 5 | 5 | 5 | 5 | 5 |

TABLE 7

| | | Example | | | | | | |
|---|---|---|---|---|---|---|---|---|
| | | 28 | 29 | 30 | 31 | 32 | 33 | 34 |
| Alcohol | THFA | 50 | 50 | 50 | 50 | 50 | 50 | 50 |
| | IPA | | | | | | | |
| | EtOH | | | | | | | |
| | MeOH | | | | | | | |
| Alkylene glycol-based | MDG | | | | | | | |
| | MG | | | | | | | |
| | EDG | | 20 | | | | | |
| | EG | | | 20 | | | | |
| | BDG | | | | 20 | | | |
| | BG | | | | | 20 | | |
| Polar solvent | NMP | | | | | | 20 | |
| | NEP | | | | | | | 20 |
| | EL | 30 | | | | | | |
| | HBM | | 30 | 30 | 30 | 30 | 30 | 30 |
| | IP-EL | | | | | | | |
| | BL | | | | | | | |
| DI | | 20 | | | | | | |
| Sum | | 100 | 100 | 100 | 100 | 100 | 100 | 100 |
| Anisotropy | | 5 | 5 | 5 | 5 | 5 | 5 | 5 |
| Layer uniformity | | 5 | 5 | 5 | 5 | 5 | 5 | 5 |
| Black level | | 5 | 5 | 5 | 5 | 5 | 5 | 5 |
| AC residual image variation ratio | | 5 | 5 | 5 | 5 | 5 | 5 | 5 |

It was confirmed from results of Tables 1 to 7 that Examples 1 to 34 of the present invention exhibited generally excellent results in anisotropy, layer uniformity, black level, and AC residual image variation as compared to those of Comparative Examples 1 to 12. In particular, as shown in the results of Table 1, the cleaning power of Comparative Example 1 including only the EL was lower than those of Examples including the specific solvent of the present invention (particularly, THFA or HBM), and thus, physical properties of the liquid crystal alignment layer were poor. Further, the physical properties of the liquid crystal alignment layer of Comparative Examples 2 to 12 including the alcohol-based solvent, the alkylene glycol-based solvent or the polar solvent alone were generally lower than those of Examples.

(5) Evaluation of RDC (Residual DC Voltage, Residual DC)

Figure 2:
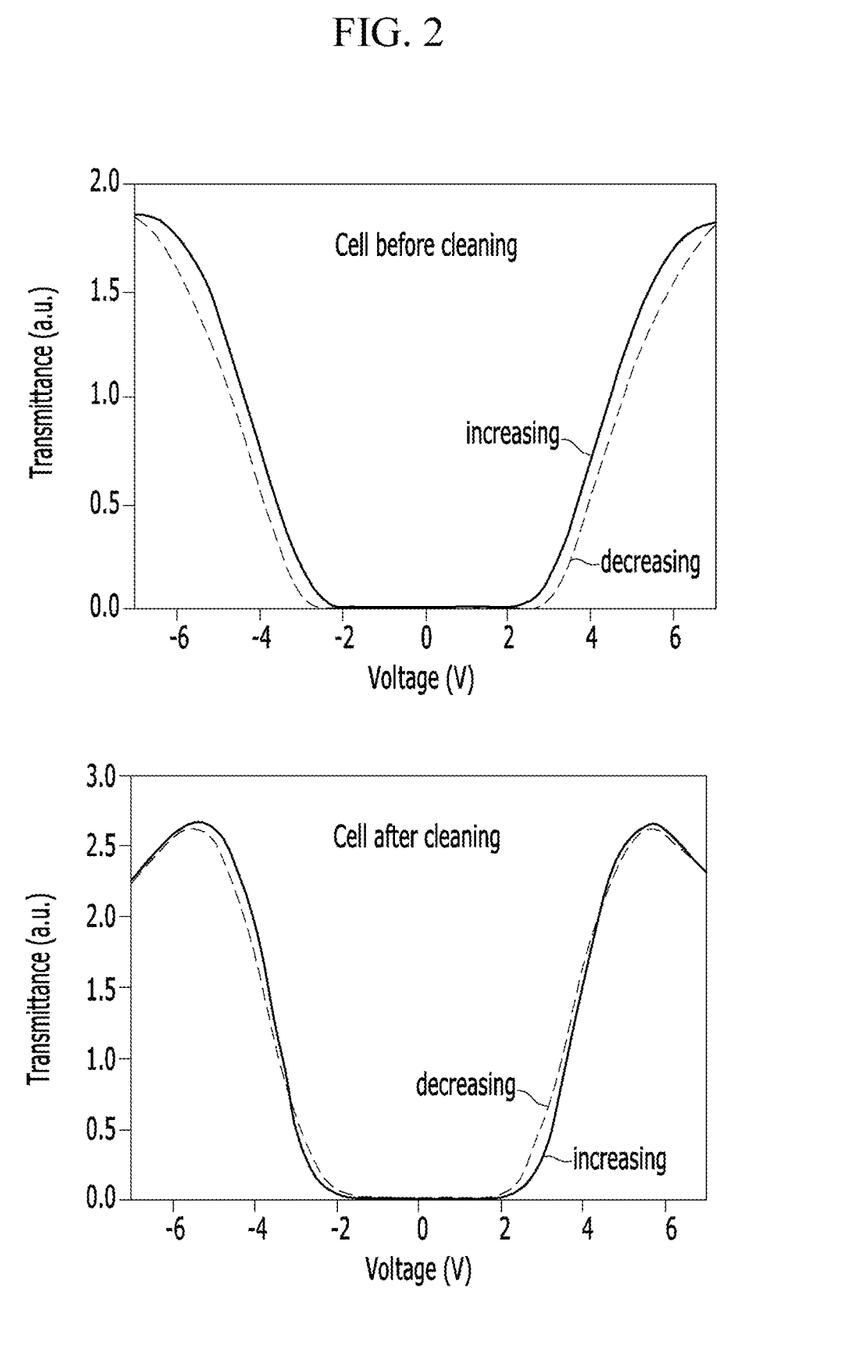
FIG. 2 shows comparison of RDC results of a liquid crystal alignment layer before and after cleaning.

The RDC of the liquid crystal alignment layer of Example 1 before and after cleaning was measured, and results thereof are shown in FIG. 2.

As shown in FIG. 2, the residual voltage characteristic was improved by using the cleaning composition of Example 1 of the present invention.

(6) Measurement of Removal Speeds of Decomposition Product (Cleaning Power is Better as Decomposition Speed is Faster)

Figure 3:
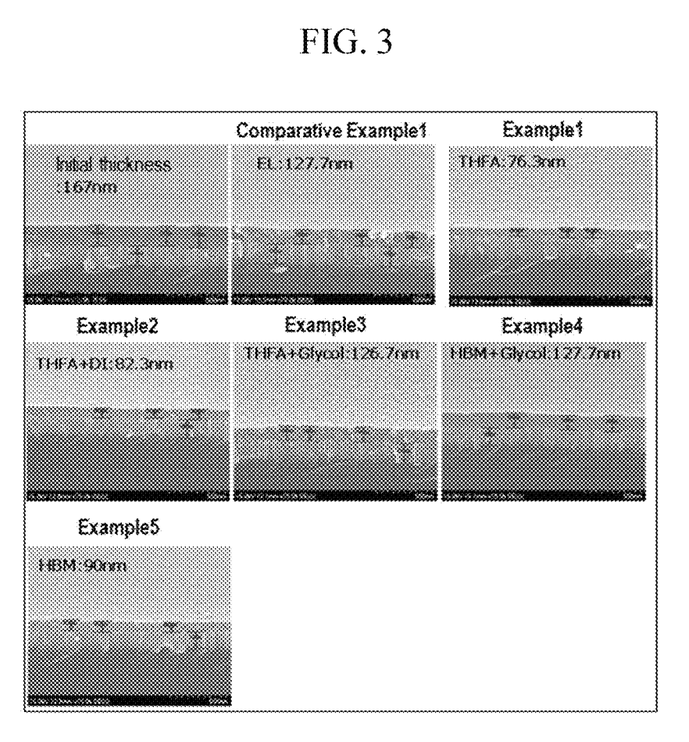
FIG. 3 shows SEM images of results of removal speeds of decomposition products after exposure in Comparative Example 1 and Examples 1 to 5, wherein removal speeds of the decomposition products after exposure are shown through the removal speed of a polyimide, by measuring thicknesses as compared to initial thicknesses before cleaning the liquid crystal alignment layers.

The removal speeds of decomposition products after exposure in Comparative Example 1 and Examples 1 to 5 were measured through the removal speed of the polyimide (thinner than an initial thickness) by a conventional method, and results thereof are shown in Table 8 and FIG. 3. That is, FIG. 3 shows SEM images of the results of the removal speeds of decomposition products after exposure in Comparative Example 1 and Examples 1 to 5, wherein the removal speeds of the decomposition products after exposure are shown through the removal speeds of a polyimide, by measuring thicknesses as compared to initial thicknesses before cleaning the liquid crystal alignment layers.

TABLE 8

| | | Residual thickness (removal is faster as residual thickness is smaller) | | | | |
|---|---|---|---|---|---|---|
| | Initial thickness 1 (Cleaning composition) | Measurement-1 | Measurement-2 | Measurement-3 | Average | Etching rate (3 min) |
| | | 170 | 164 | 167 | 167.0 | |
| Comparative Example 1 | EL | 128 | 122 | 133 | 127.7 | 12.2 |
| Example 1 | THFA | 68 | 82 | 79 | 76.3 | 30.2 |
| Example 2 | THFA + DI | 85 | 77 | 85 | 82.3 | 28.2 |
| Example 3 | THFA + glycol | 125 | 125 | 130 | 126.7 | 12.5 |
| Example 4 | THFA + glycol | 122 | 133 | 128 | 127.7 | 12.2 |
| Example 5 | HBM | 91 | 94 | 85 | 90.0 | 25.6 |

It was confirmed from results of Table 8 and FIG. 3 that the decomposition speeds of Examples 1 to 5 of the present invention were faster than those of Comparative Example 1 including ethyl lactate, and thus the cleaning power of Examples 1 to 5 was excellent.

(7) Measurement of RDC

The RDC of Comparative Example 1 and Examples 1 to 5 was measured by a conventional method, and results thereof are shown in Table 9 below.

TABLE 9

| | Cleaning composition | (+)RDC(V) | (−)RDC | average RDC(V) | Determination |
|---|---|---|---|---|---|
| Comparative Example 1 | EL | 0.264 | 0.425 | 0.345 | 3 |
| Example 1 | THFA | 0.056 | 0.071 | 0.064 | 5 |
| Example 2 | THFA + DI | 0.037 | 0.106 | 0.072 | 5 |
| Example 3 | THFA + glycol | 0.224 | 0.165 | 0.195 | 4 |
| Example 4 | THFA + glycol | 0.178 | 0.302 | 0.240 | 4 |
| Example 5 | HBM | 0.102 | 0.084 | 0.093 | 5 |

It was confirmed from Table 9 that the residual DC values of Examples 1 to 5 of the present invention were smaller than those of Comparative Example 1 only including ethyl lactate, and thus, the cleaning power of Examples 1 to 5 was excellent.

The invention claimed is:

1. A cleaning composition for a liquid crystal alignment layer comprising:

tetrahydrofurfuryl alcohol or methyl 2-hydroxyisobutyrate, wherein the cleaning composition for a liquid crystal alignment layer is for cleaning a UV-aligned liquid crystal alignment layer including polyimide or a polyimide precursor, wherein the cleaning composition includes 20 to 1-50 wt % of the tetrahydrofurfuryl alcohol or the methyl 2-hydroxyisobutyrate, and 50 to 80 wt % of at least one compound selected from the group consisting of an alkylene glycol-based compound and a polar solvent based on the total weight of the composition, and wherein the alkylene glycol-based compound has a viscosity of 10 cP or less and a boiling point of at least 150° C. or more and the polar solvent has a viscosity of 5 cP or less and a boiling point of at least 100° C. or more.

2. The cleaning composition for a liquid crystal alignment layer of claim 1, further comprising:

1 to 70 wt % of deionized water.

3. The cleaning composition for a liquid crystal alignment layer of claim 1, wherein:

the alkylene glycol-based compound is at least one selected from the group consisting of diethyleneglycol tertbutyl ether, diethyleneglycol monomethyl ether, diethyleneglycol monoethyl ether, diethyleneglycol monobutyl ether, dipropyleneglycol monomethyl ether, dipropyleneglycol monoethyl ether, ethyleneglycol monomethyl ether, ethyleneglycol monobutyl ether, ethyleneglycol monoethyl ether, propyleneglycol monomethyl ether, and propyleneglycol monomethyl ether acetate.

4. The cleaning composition for a liquid crystal alignment layer of claim 1, wherein:

the polar solvent is at least one selected from the group consisting of ethyl lactate, butyl lactate, hydroxyl acid ester, N-methyl pyrrolidone, N-ethyl pyrrolidone, N-methyl formamide, 1,3-dimethyl-2-imidazolidinone, dimethylsulfoxide, dimethylacetamide, dimethylformamide, and tetramethylenesulfone.

5. The cleaning composition for a liquid crystal alignment layer of claim 1, wherein:

the liquid crystal alignment layer is obtained by a method including:

forming a polyimide layer by coating and firing a liquid crystal alignment agent containing at least one polymer selected from the group consisting of a polyimide and a polyimide precursor on a substrate; and performing a UV alignment process by irradiating polarized radiation to the substrate on which the polyimide layer is formed.

6. The cleaning composition for a liquid crystal alignment layer of claim 5, wherein:

the polyimide precursor includes a repeating unit represented by Chemical Formula 1 below, and a repeating unit represented by Chemical Formula 2 below:

[Chemical Formula 1]

[Chemical Formula 2]

in Chemical Formulas 1 and 2, $X^1$ and $X^2$ are each independently a quadrivalent organic group derived from a C4-C20 hydrocarbon, or a quadrivalent organic group in which at least one H is substituted with a halogen or at least one —$CH_2$— is replaced with —O—, —S—, —CO— or —SO— so that oxygen atoms are not directly connected, in the quadrivalent organic group, $R^1$ to $R^4$ are each independently hydrogen or a C1-C10 alkyl group, $R^5$ to $R^7$ are each independently a halogen, a cyano group, a C2-C10 alkenyl group, a C1-C10 alkyl group, a C1-C10 alkoxy group, or a C1-C10 fluoroalkyl group, $L^1$ is —O—, —O—$CH_2$—O—, —O—$CH_2CH_2$—O—, or —O—$CH_2CH_2CH_2$—O—, p, q and r are each independently an integer of 0 to 4, and n is an integer of 1 or 2.

7. A manufacturing method of a liquid crystal alignment layer, the manufacturing method comprising:

forming a polyimide layer by coating and firing a liquid crystal alignment agent containing at least one polymer selected from the group consisting of a polyimide and a polyimide precursor on a substrate;

performing a UV alignment process by irradiating polarized radiation to the substrate on which the polyimide layer is formed;

cleaning a polymer surface on the substrate in which the UV alignment process is completed, using a cleaning composition; and drying the cleaned substrate, wherein the cleaning composition includes tetrahydrofurfuryl alcohol or methyl 2-hydroxyisobutyrate, and in the cleaning, an ionic byproduct including a UV decomposition product of the polyimide layer is washed and removed from the polymer surface of the polyimide layer by the cleaning composition.

8. The manufacturing method of claim 7, wherein:

the cleaning composition further includes at least one compound selected from the group consisting of an alkylene glycol-based compound having a viscosity of 10 cP or less and a boiling point of at least 150° C. or more and a polar solvent having a viscosity of 5 cP or less and a boiling point of at least 100° C. or more.

9. The manufacturing method of claim 7, wherein:

the cleaning composition includes a) 100 wt % of the tetrahydrofurfuryl alcohol or the methyl 2-hydroxyisobutyrate, or b) 1 to 99 wt % of the compound a); and 0.1 to 99 wt % of at least one compound selected from the group consisting of an alkylene glycol-based compound and a polar solvent.

10. The manufacturing method of claim 7, wherein:

the cleaning composition further includes 1 to 70 wt % of deionized water.

11. The manufacturing method of claim 8, wherein:

the alkylene glycol-based compound is at least one selected from the group consisting of diethyleneglycol tertbutyl ether, diethyleneglycol monomethyl ether, diethyleneglycol monoethyl ether, diethyleneglycol monobutyl ether, dipropyleneglycol monomethyl ether, dipropyleneglycol monoethyl ether, ethyleneglycol monomethyl ether, ethyleneglycol monobutyl ether, ethyleneglycol monoethyl ether, propyleneglycol monomethyl ether, and propyleneglycol monomethyl ether acetate.

12. The manufacturing method of claim 8, wherein:

the polar solvent is at least one selected from the group consisting of ethyl lactate, butyl lactate, hydroxyl acid ester, N-methyl pyrrolidone, N-ethyl pyrrolidone, N-methyl formamide, 1,3-dimethyl-2-imidazolidinone, dimethylsulfoxide, dimethylacetamide, dimethylformamide, and tetramethylenesulfone.

13. The manufacturing method of claim 7, wherein:

the firing in the forming of the polyimide layer includes a soft baking process or a hard baking process.

14. The manufacturing method of claim 7, wherein:

the polyimide precursor includes a repeating unit represented by Chemical Formula 1 below, and a repeating unit represented by Chemical Formula 2 below:

[Chemical Formula 1]

[Chemical Formula 2]

in Chemical Formulas 1 and 2, $X^1$ and $X^2$ are each independently a quadrivalent organic group derived from a C4-C20 hydrocarbon, or a quadrivalent organic group in which at least one H is substituted with a halogen or at least one —$CH_2$— is replaced with —O—, —S—, —CO— or —SO— so that oxygen atoms are not directly connected, in the quadrivalent organic group, $R^1$ to $R^4$ are each independently hydrogen or a C1-C10 alkyl group, $R^5$ to $R^7$ are each independently a halogen, a cyano group, a C2-C10 alkenyl group, a C1-C10 alkyl group, a C1-C10 alkoxy group, or a C1-C10 fluoroalkyl group, $L^1$ is —O—, —O—CH$_2$—O—, —O—CH$_2$CH$_2$—O—, or —O—CH$_2$CH$_2$CH$_2$—O—, p, q and r are each independently an integer of 0 to 4, and n is an integer of 1 or 2.

15. The manufacturing method of claim 7, wherein:
the polyimide precursor has a weight average molecular weight of 1,000 to 200,000 g/mol.

16. The manufacturing method of claim 7, wherein:
in the performing of the UV alignment process, the substrate on which the polyimide layer is formed is irradiated with ultraviolet light or visible light having a wavelength of 150 to 450 nm, and linearly polarized light is irradiated in a vertical direction or an oblique direction to the alignment layer.

17. A liquid crystal display device comprising the liquid crystal alignment layer manufactured by the manufacturing method of claim 7, wherein the liquid crystal alignment layer has an increase in anisotropy value of at least 10% compared to a liquid crystal alignment layer obtained without the cleaning step, the anisotropy value being evaluated by the AxoStep method.

18. The cleaning composition for a liquid crystal alignment layer of claim 1, wherein the cleaning composition includes 100 wt % of the tetrahydrofurfuryl alcohol or the methyl 2-hydroxyisobutyrate.

\* \* \* \* \*